United States Patent [19]

Takei

[11] Patent Number: 5,513,916
[45] Date of Patent: May 7, 1996

[54] LINEAR MOTION ROLLING GUIDE UNIT HAVING MOUNTING ARRANGEMENT ADAPTED TO ELIMINATE TRACK DEFORMATION

[75] Inventor: Seiji Takei, Kanagawa, Japan

[73] Assignee: Nippon Thompson Co., Ltd., Tokyo, Japan

[21] Appl. No.: 294,032

[22] Filed: Aug. 24, 1994

Related U.S. Application Data

[63] Continuation of Ser. No. 44,469, Apr. 9, 1993, abandoned.

[30] Foreign Application Priority Data

Apr. 24, 1992 [JP] Japan .................... 4-033924 U

[51] Int. Cl.[6] .................................................. F16C 29/04
[52] U.S. Cl. .............................................. 384/59; 384/55
[58] Field of Search ........................... 384/19, 22, 23, 384/44, 47, 49, 50, 55, 56, 57, 59, 43, 45, 46, 48, 51–54, 58

[56] References Cited

U.S. PATENT DOCUMENTS 2,785,934  3/1957  Alderstam et al. ................. 384/44
4,944,607  7/1990  Jacob ................................... 384/47

FOREIGN PATENT DOCUMENTS

258846    3/1988  European Pat. Off. ............ 384/50
3720454   2/1988  Germany ............................ 384/50
4217663  12/1992  Germany ............................ 384/51

Primary Examiner—Thomas R. Hannon
Attorney, Agent, or Firm—Sughrue, Mion, Zinn, Macpeak & Seas; Richard C. Turner; Paul F. Neils

[57] ABSTRACT

A linear motion rolling guide unit that obtains high operating accuracy while suppressing sliding resistance to a low level without affecting the mounting state. The bottom surfaces of countersunk portions for insertion of fastening members are formed so as to be positioned, in the direction of said fastening, either on or below a hypothetical extended surface of that one of two bearing surfaces of a track surface that is positioned in said direction of fastening of the fastening member. The opening angle of the track surface is thus not narrowed by the fastening of said fastening members thus allowing high operating accuracy to be obtained and sliding resistance to be suppressed to a low level.

2 Claims, 8 Drawing Sheets

PRIOR ART

Fig.8

LINEAR MOTION ROLLING GUIDE UNIT HAVING MOUNTING ARRANGEMENT ADAPTED TO ELIMINATE TRACK DEFORMATION This is a Continuation of application Ser. No. 08/044,469 filed Apr. 9, 1993 now abandoned.

BACKGROUND OF THE INVENTION

1. Field of the Invention

The present invention relates to a linear motion rolling guide unit performing guidance of relative motion that is used in mechanisms, such as machine tools and industrial robots, that perform relative motion.

2. Description of the Prior Art

An example of this type of linear motion rolling guide unit of the prior art is indicated in FIGS. 1 through 4.

Figure 1:
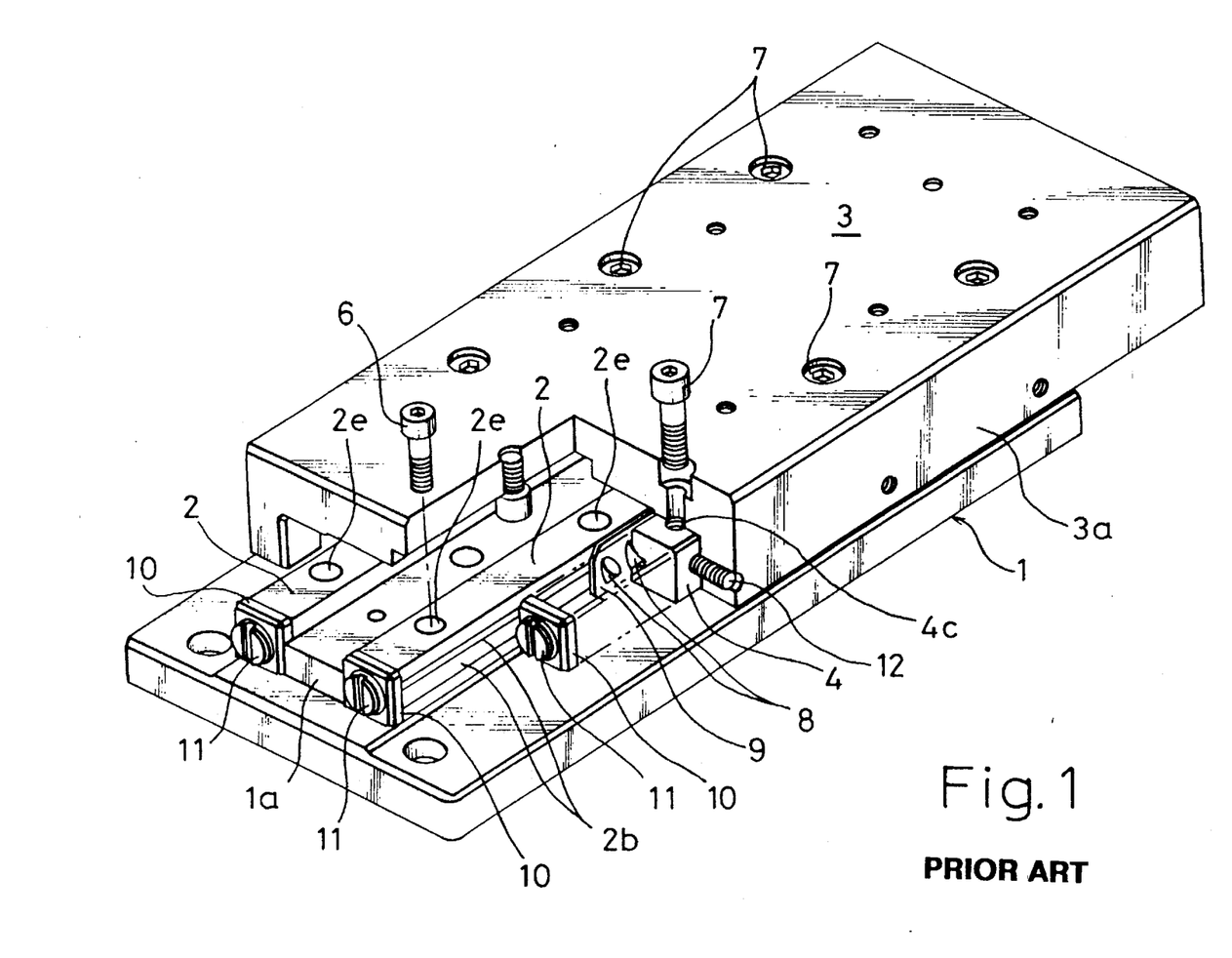
FIG. 1 is a perspective view, including a partial cross-section, of the essential components of an apparatus containing a linear motion rolling guide unit of the prior art.
Figure 2:
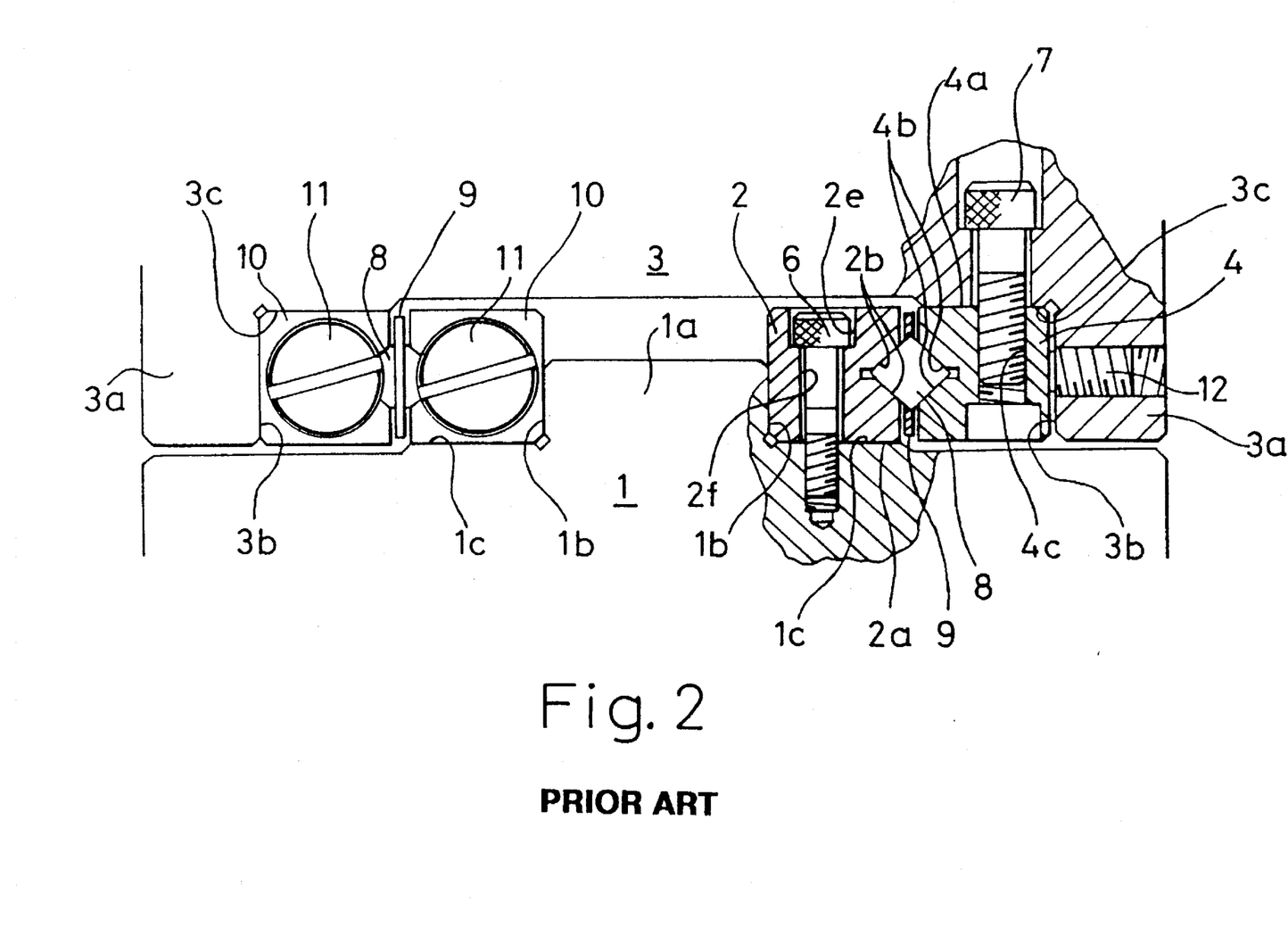
FIG. 2 is a side view, containing a partial cross-section, of the essential components indicated in FIG. 1.
Figure 3:
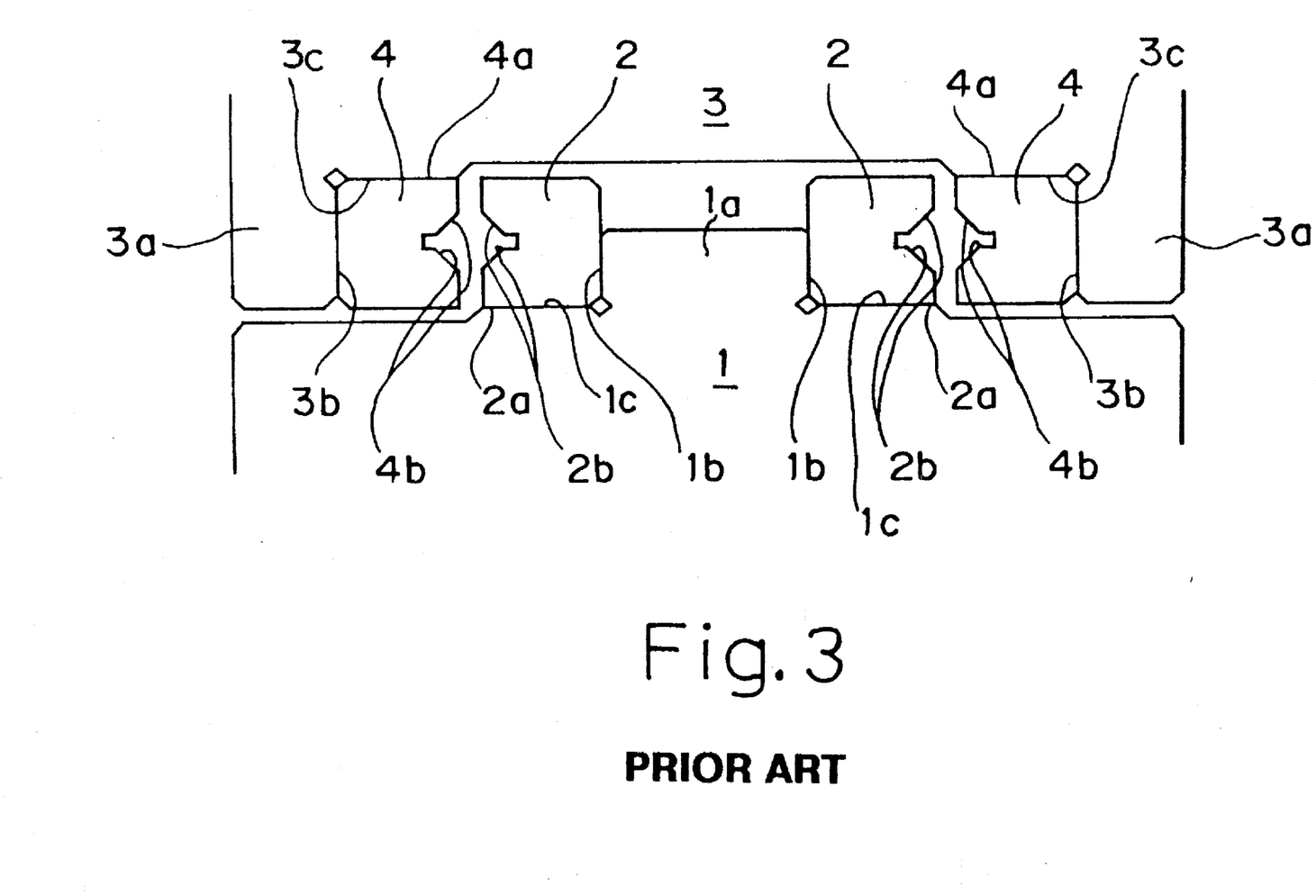
FIG. 3 is a side view approximately indicating the constitution indicated in FIG. 2.

As indicated in FIGS. 1 through 3, said linear motion rolling guide unit is equipped with track rail 2 fixed on bed 1 functioning as the stationary side, and track rail 4 fixed on table 3 functioning as the moving side. A total of 4 of these track rails 2 and 4 are provided in the form of 2 sets with one set consisting of a pair of corresponding rails. Furthermore, there are also cases wherein table 3 is used as the stationary side and bed 1 is used as the moving side.

Bed 1 has projection 1a in its center, with the right and left sides of said projection 1a forming mounting surfaces 1b. The inside surfaces of track rails 2 make contact with mounting surfaces 1b. Mounting surfaces 1c are formed near the right and left sides of the above-mentioned projection 1a, and mounting surfaces 2a formed in the bottom of track rails 2 make contact with these mounting surfaces 1c.

Figure 4:
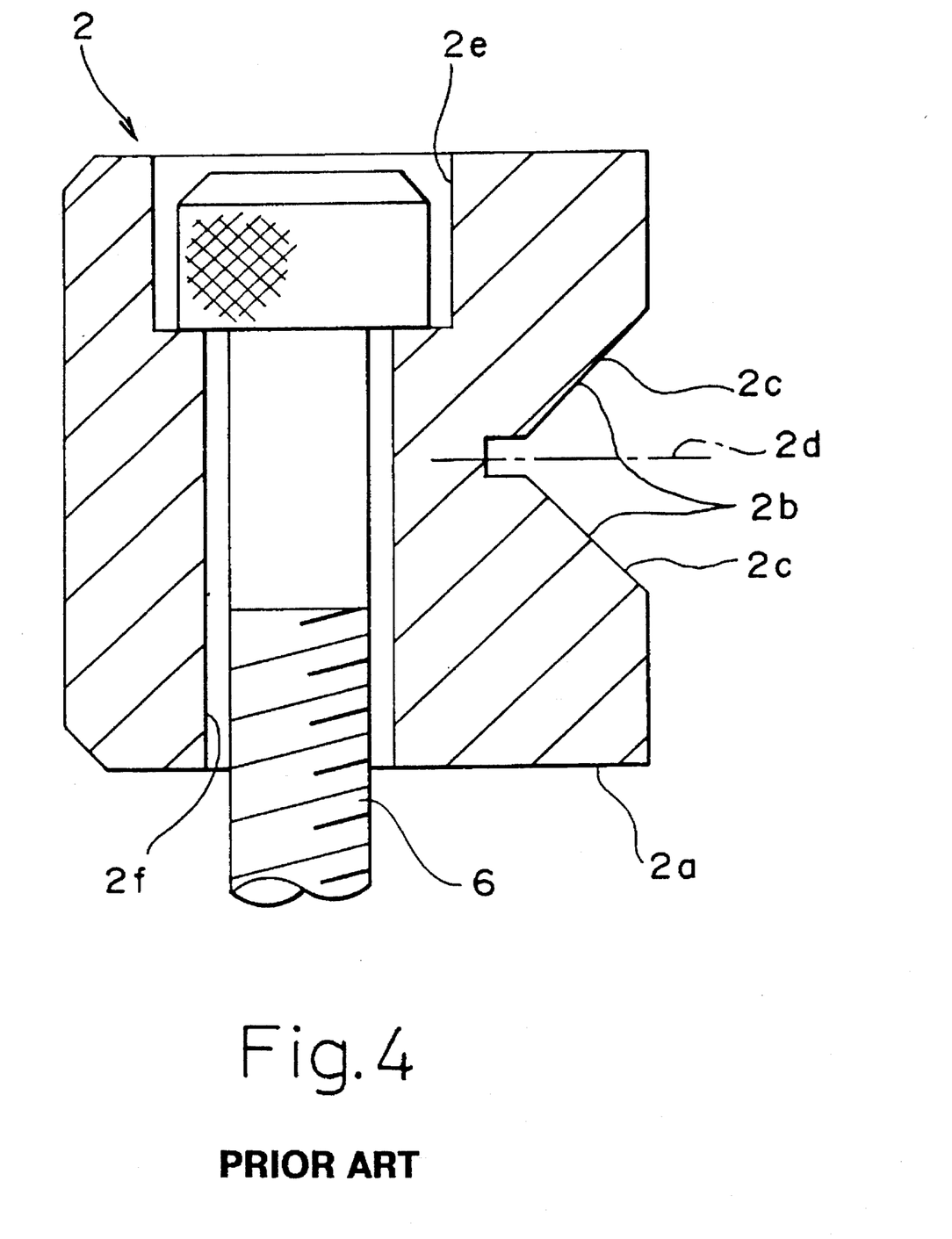
FIG. 4 is a cross-sectional view indicating a track rail and the bolt that is inserted into said track rail equipped on the linear motion rolling guide unit indicated in FIGS. 1 through 3.

Track surfaces 2b, having roughly V-shaped cross-sections, are formed along the lengthwise direction on the outside of track rails 2. As indicated in FIG. 4, said track surfaces 2b have two flat bearing surfaces 2c mutually intersecting at an angle of, for example, 90 degrees. As is particularly clear from FIG. 4, countersunk portions 2e and threaded insertion holes 2f are concentrically formed extending perpendicular to center line 2d of the angle formed by the above-mentioned track surfaces 2b. The head and threaded portion of a fastening member in the form of bolts 6 (with hexagonal sockets) are inserted into countersunk portions 2e and threaded insertion holes 2f, respectively. These bolts 6 are screwed into bed 1 resulting in track rail 2 being fastened to bed 1. Furthermore, countersunk portions 2e are formed in the uppermost side of track rails 2.

On the other hand, in FIGS. 2 and 3, the other track rails 4, which form pairs with the above-mentioned track rails 2, are attached to table 3 in the manner described below.

In other words, hanging portions 3a are formed on the right and left sides of table 3, and the inside surfaces of each of said hanging portions 3a serve as mounting surfaces 3b. The outside surfaces of track rails 4 then make contact with these mounting surfaces 3b. Mounting surfaces 3c are also formed on the inside of each of the above-mentioned hanging portions 3a on table 3, and mounting surfaces 4a formed on track rails 4 make contact with these mounting surfaces 3c.

V-shaped cross-sectional track surfaces 4b, having two intersecting flat bearing surfaces (not provided with reference numerals) are formed along the lengthwise direction on the insides of track rails 4 in the same manner as track surfaces 2b of the above-mentioned track rails 2. These track rails 4 and the above-mentioned track rails 2 are arranged so that the respective track surfaces 2b and 4b of each of these oppose each other. Furthermore, as indicated in FIGS. 1 and 2, threaded holes 4c are formed in track rails 4, and said track rails 4 are fastened to table 3 by bolts (with hexagonal sockets) 7 that are screwed into said threaded holes 4c.

As indicated in FIGS. 1 and 2, a plurality of rollers 8, and roughly rectangular plate-shaped cage 9, which hold each of said rollers 8 while allowing them to rotate freely, are juxtaposed between the above-mentioned track surfaces 2b and 4b. Each of rollers 8 is arranged in a row so that the central axes of rotation of adjacent rollers mutually cross. Said rollers then roll over each of the above-mentioned track surfaces 2b and 4b.

Furthermore, as indicated in FIGS. 1 and 2, end locking plates 10 and end screws 11 are mounted on the ends of each of track rails 2 and 4 to prevent the above-mentioned cage 9 and rollers 8 from coming out. In addition, as indicated in the same drawings, pre-loading adjustment screw 12, that engages with track rail 4, is screwed into one of the hanging portions 3a of table 3.

As indicated in FIG. 4, in the case of the above-mentioned linear motion rolling guide unit of the prior art, strain forms in the upper portion of track rail 2 as indicated by the double broken line and the opening angle of track surfaces 2b narrows as a result of tightening bolts 6. Thus, said linear motion rolling guide unit of the prior art has the disadvantage of poor operating accuracy and sliding resistance.

SUMMARY OF THE INVENTION

In consideration of the above-mentioned disadvantages of the prior art, the object of the present invention is to provide a linear motion rolling guide unit that continuously allows the obtaining of high operating accuracy without being affected by the mounting state without bringing about an increase in sliding resistance.

The present invention comprises a linear motion rolling guide unit equipped with: a pair of track rails allowing relative movement, in which roughly V-shaped cross-sectional track surfaces, having two intersecting bearing surfaces, are each formed along the lengthwise direction and arranged to be opposing each other; a plurality of rollers, which are arranged in a row between the above-mentioned track surfaces so that the central axes of rotation of adjacent rollers mutually cross each other, and which roll over the above-mentioned bearing surfaces; a cage that holds each of the above-mentioned rollers while allowing them to rotate freely; and, countersunk portions and threaded insertion holes, which allow insertion of fastening members extending roughly perpendicular to the center line of the angle formed by the above-mentioned track surfaces, and which are formed concentrically in at least one of each of the above-mentioned track rails; wherein, the bottom surfaces of the above-mentioned countersunk portions are formed so as to be positioned, in the direction of fastening, either on or below that one of the hypothetical extended surfaces that extends from the lowermost bearing surface.

In addition the present invention also comprises a linear motion rolling guide unit equipped with: a pair of track rails allowing relative movement that have a track surface having two intersecting bearing surfaces and a roughly V-shaped cross-section, and a track surface formed into a projection, formed along the lengthwise direction, with the above-mentioned track surface formed into a projection arranged so as to be inserted into the above-mentioned V-shaped track surface; a plurality of cylindrical rollers, which are arranged in a row between the above-mentioned V-shaped track surface and the above-mentioned track surface formed into a projection, and which roll over the above-mentioned bearing surfaces; a cage that holds each of the above-mentioned rollers while allowing them to rotate freely; and, countersunk portions and threaded insertion holes, which allow insertion of fastening members extending roughly perpendicular to the center line of the angle formed by the above-mentioned V-shaped track surface, and which are formed concentrically in at least one of each of the above-mentioned track rails having the above-mentioned V-shaped track surface; wherein, the bottom surfaces of the above-mentioned countersunk portions are formed so as to be positioned, in the direction of fastening, either on or below a hypothetical extended surface extending from the lower one of the above-mentioned bearing surfaces.

DESCRIPTION OF THE PREFERRED EMBODIMENTS

The following provides an explanation of embodiments of the present invention with reference to the attached drawings.

Figure 5:
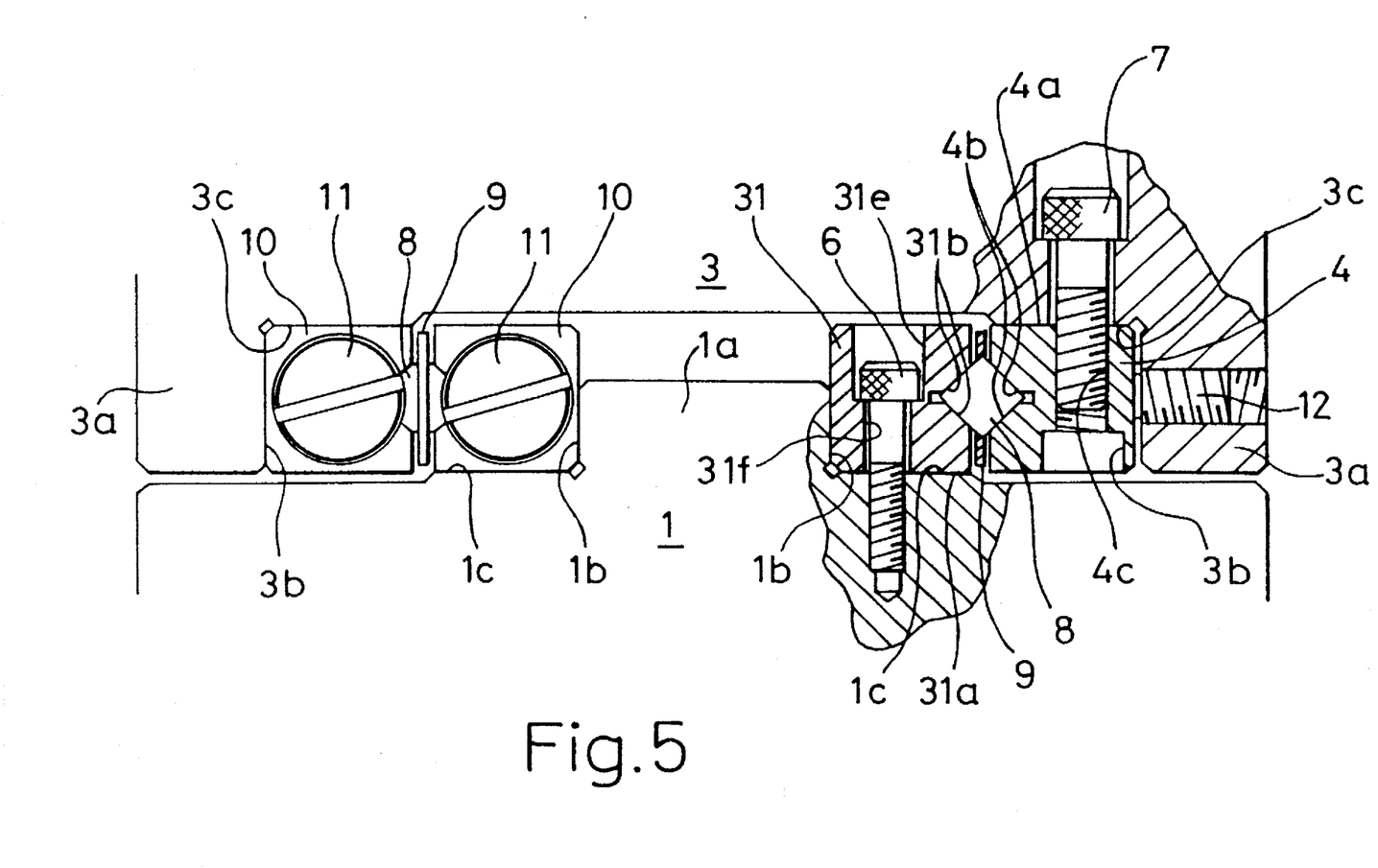
FIG. 5 is a side view, including a partial cross-section, of the essential components of an apparatus containing a linear motion rolling guide unit in the form of a first embodiment of the present invention.
Figure 6:
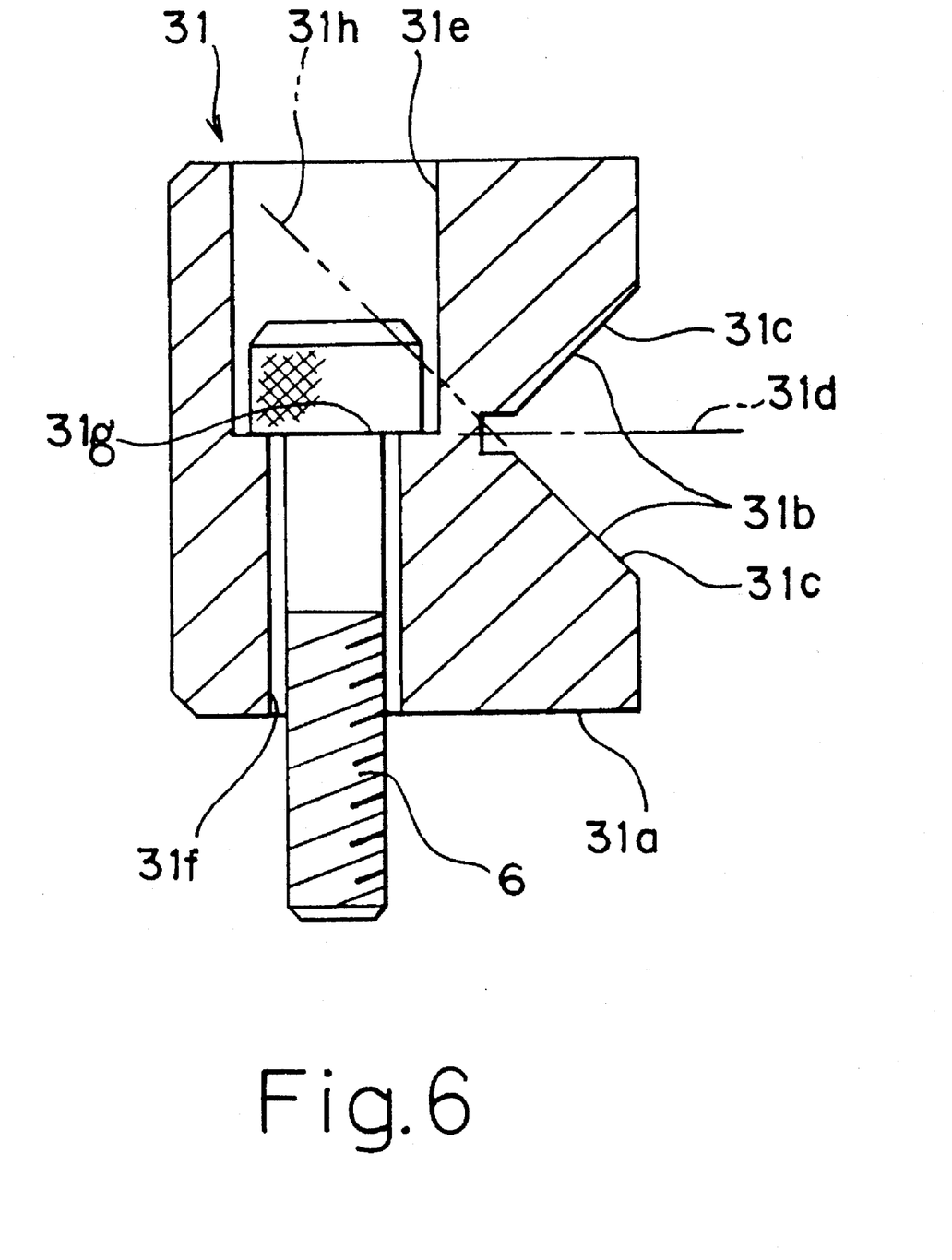
FIG. 6 is a cross-sectional view indicating a track rail and a bolt that is inserted into said track rail equipped on the linear motion rolling guide unit indicated in FIG. 5.

FIGS. 5 and 6 indicate a linear motion rolling guide unit in the form of a first embodiment of the present invention. Furthermore, since said linear motion rolling guide unit has a similar constitution to the linear motion rolling guide unit of the prior art indicated in FIGS. 1 through 4 with the exception of the essential components explained below, a detailed description will not be provided for the entire unit. In addition, in the explanation provided below, the same reference numerals are used for those constituent members that are the same as those of said linear motion rolling guide unit of the prior art. In addition, this applies similarly in the explanation of a forthcoming explanation of a second embodiment.

In the linear motion rolling guide unit in the form of a first embodiment, track rail 31 fixed on bed 1 to form a pair with track rail 4 mounted on the side of table 3 is formed in the manner described below.

As indicated in FIGS. 5 and 6, the track rail 31 makes contact with the side of projection 1a formed on bed 1, or in other words, mounting surface 1b on its inside surface. Said track rail 31 also makes contact with mounting surface 1c formed near said mounting surface 1b with mounting surface 31a on its bottom.

On the other hand, track surface 31b, having a roughly V-shaped cross-section, is formed along the lengthwise direction on the outside of track rail 31. This track surface 31b opposes track surface 4b of the other track rail 4. As indicated in FIG. 6, this track surface 31b has two flat bearing surfaces 31c that mutually intersect at an angle of, for example, 90 degrees. As is particularly clear from FIG. 6, countersunk portions 31e and threaded insertion holes 31f, which extend perpendicular to center line 31d of the angle formed by the above-mentioned track surfaces 31b, are formed concentrically in track rail 31. The heads and threaded portions of fastening members in the form of bolts 6 (with hexagonal sockets) are each inserted into each countersunk portion 31e and threaded insertion hole 31f. These bolts 6 are screwed into bed 1 resulting in track rail 31 being fastened to bed 1. Furthermore, countersunk portions 31e are formed in the uppermost side of track rail 31.

As indicated in FIG. 6, bottom surfaces 31g of the above-mentioned countersunk portions 31e are formed so as to be positioned, in the direction of said fastening, on hypothetical extended surface 31h or below said hypothetical extended surface 31h of the bearing surface 31c that form track surface 31b. Furthermore, this fastening direction refers to the direction from the uppermost portion of track rail 31 towards mounting surface 31a. Due to said constitution, generation of strain in the upper track of track rail 31 due to fastening of bolts 6 is prevented and there is no narrowing of the opening angle of track surface 31b. Thus, high operating accuracy is constantly able to be obtained and sliding resistance is suppressed to a low level.

Next, the following provides an explanation of a linear motion rolling guide unit in the form of a second embodiment of the present invention.

Figure 7:
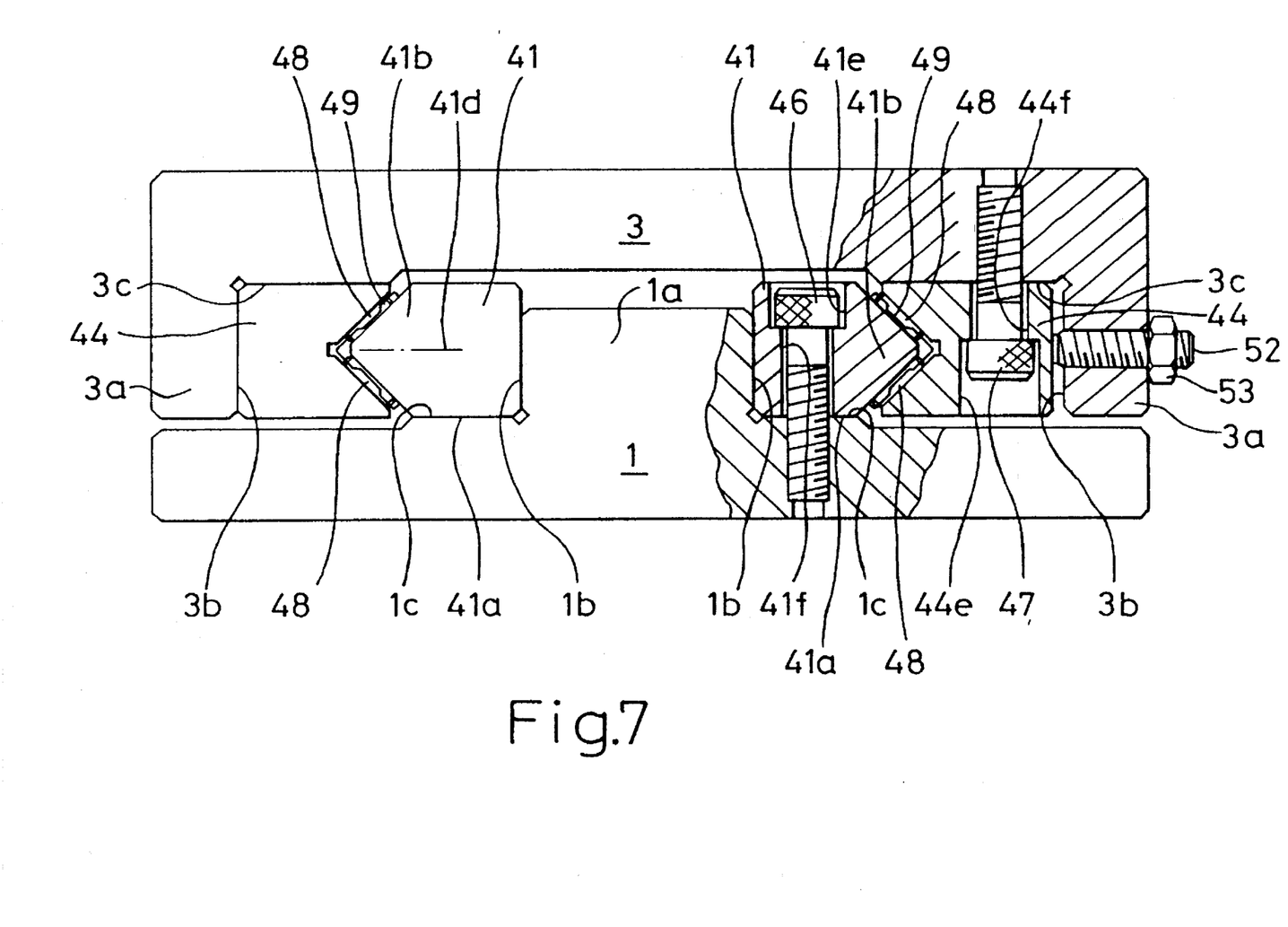
FIG. 7 is a side view, including a partial cross-section, of the essential components of an apparatus containing a linear motion rolling guide unit in the form of a second embodiment of the present invention.

As indicated in FIG. 7, the linear motion rolling guide unit in the form of a second embodiment of the present invention is equipped with track rail 41 fixed on bed 1 and track rail 44 fixed on table 3. A total of four of these track rails 41 and 44 are provided in the form of two sets with one set comprising one mutually corresponding pair each.

The other track rail 41 makes contact with projection 1a formed on bed 1, or in other words, mounting surface 1b, with its inside surface. Said track rail 41 also makes contact with mounting surface 1c formed near said mounting surface 1b with bottom mounting surface 41a.

A track surface (not provided with reference numerals) formed into projection 41b, having a roughly V-shaped cross-section, is formed along the lengthwise direction on the outside of track rail 41. This track surface formed into projection 41b has two flat bearing surfaces (not provided with reference numerals) that mutually intersect at an angle of, for example, 90 degrees. Countersunk portions 41e and threaded insertion holes 41f, extending perpendicular to center line 41d of the above-mentioned projection 41b, are formed concentrically in track rail 41. The heads and threaded portions of fastening members in the form of bolts 46 (with hexagonal sockets) are inserted into each of countersunk portions 41e and threaded insertion holes 41f. These bolts 46 are screwed into bed 1 resulting in track rail 41 being fastened to bed 1.

On the other hand, the other track rail 44, forming a pair with the above-mentioned track rail 41, is mounted on table 3 in the manner described below.

In other words, the outside surface of track rail 44 makes contact with the inside surface of hanging portion 3b projecting from the right and left sides of table 3, or in other words, mounting surface 3b. Mounting surface 44a formed in track rail 44 makes contact with mounting surface 3c provided near said hanging portion 3b.

Figure 8:
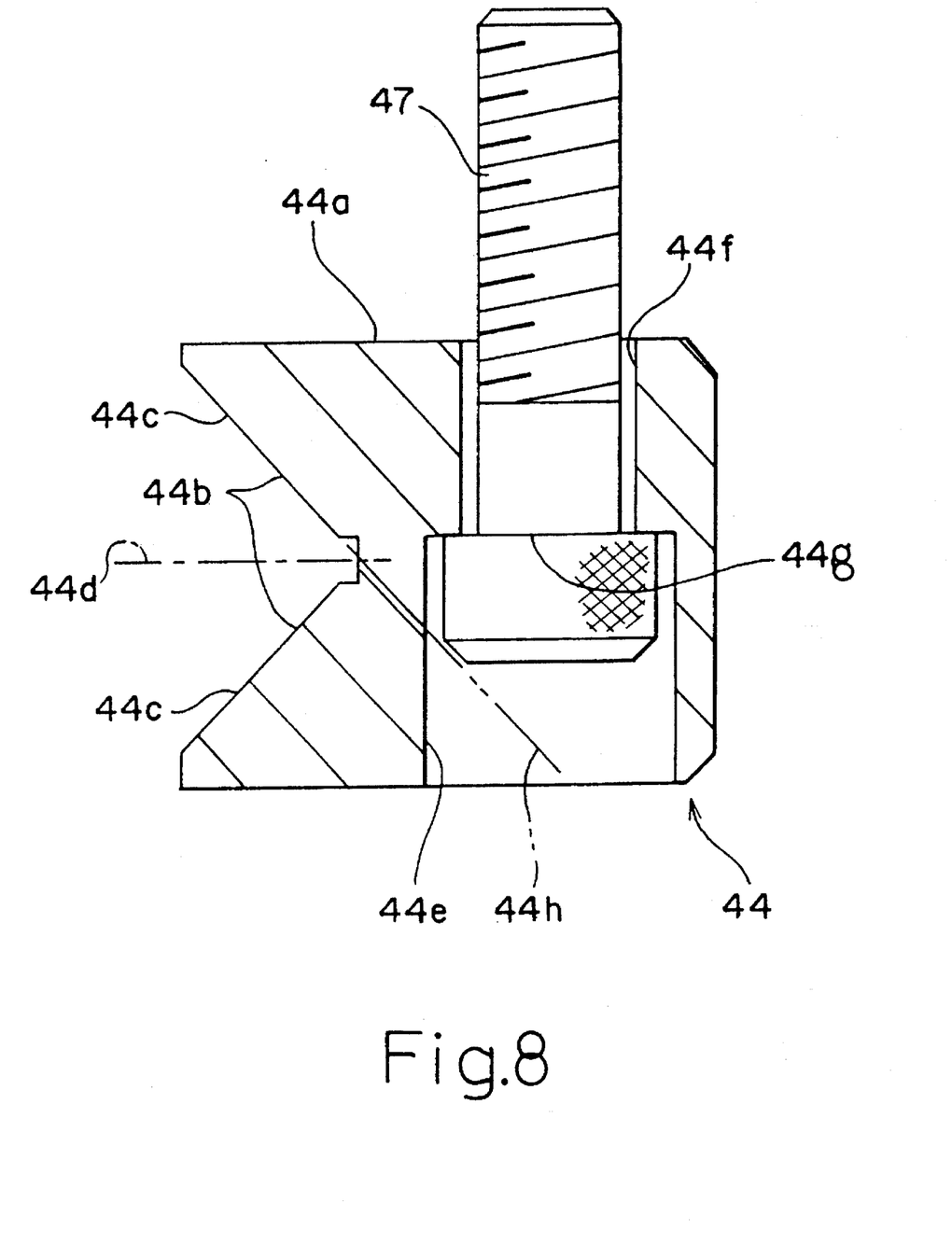
FIG. 8 is a cross-sectional view indicating a track rail and a bolt that is inserted into said track rail equipped on the linear motion rolling guide unit indicated in FIG. 7.

As is clear from FIG. 8, track surface 44b, having a roughly V-shaped cross-section, is formed along the lengthwise direction in the inside surface of track rail 44. Projection 41b of the above-mentioned track rail 41 is inserted into this V-shaped track surface 44b. This V-shaped track surface 44b has two flat bearing surfaces 44c that mutually intersect at an angle of, for example, 90 degrees. As is particularly clear from FIG. 8, countersunk portions 44e and threaded insertion holes 44f, extending perpendicular to center line 44d of the angle formed by the above-mentioned track surfaces 44b, are formed concentrically in track rail 44. The heads and threaded portions of fastening members in the form of bolts 47 (with hexagonal sockets) are inserted into each of these countersunk portions 44e and threaded insertion holes 44f. These bolts 47 are screwed into table 3 resulting in track rail 44 being fastened to table 3. Furthermore, countersunk portions 44e are formed in the uppermost side of track rail 44.

As indicated in FIG. 8, bottom surface 44g of the above-mentioned countersunk portion 44e is formed so as to be positioned, in the direction of fastening, either on or below hypothetical extended surface 44h of one of the two bearing surfaces 44c that form track surface 44b. Furthermore, the direction of fastening refers to the direction from the uppermost portion of track rail 44 towards mounting surface 44a. Due to said constitution, generation of strain in the tracks of track rail 44 due to fastening of bolts 47 is prevented and there is no narrowing of the opening angle of track surface 44b. Thus, high operating accuracy is constantly able to be obtained and sliding resistance is suppressed to a low level.

As indicated in FIG. 7, a plurality of cylindrical rollers 48 and rectangular plate-shaped cage 49, which holds said cylindrical rollers while allowing them to rotate freely, are juxtaposed between projection 41b and track surface 44b of the above-mentioned track rails 41 and 44, respectively. These cylindrical rollers bear the load by rolling over the track surface formed into the above-mentioned projection 41b and each of the bearing surfaces of track surface 44b.

Furthermore, as indicated in FIG. 7, pre-loading adjustment screw 52, that engages with track rail 44, screws into one of the hanging portions 3a of table 3, and lock nut 53 is screwed onto said pre-loading adjustment screw 52.

According to the present invention as explained above, since the bottom surfaces of countersunk portions for insertion of fastening members formed in a track rail are formed so as to be positioned, in the direction of said fastening, either on or below a hypothetical extended surface of one of two bearing surfaces of a track surface that is positioned in said direction of fastening of said fastening members, the opening angle of the track surface is not narrowed by the fastening of said fastening members thus offering the advantage of allowing high operating accuracy to be constantly obtained and sliding resistance to be suppressed to a low level.

What is claimed is:

1. A linear motion rolling guide unit comprising:

a first rack rail and a second track rail, said first track rail including a track surface having two intersecting bearing surfaces and a roughly V-shaped cross-section, said second track rail including a track surface formed into a projection, said V-shape and said projection being formed along a lengthwise direction, said projection being arranged so as to be inserted into said V-shape;

a plurality of cylindrical rollers arranged between said V-shape and said projection, and which roll over said bearing surfaces;

countersunk portions and insertion holes, which allow insertion of fastening members in a direction roughly perpendicular to a center line of an angle formed by said V-shape, and which are formed concentrically in at least said first track rail having said V-shape;

wherein, bottom surfaces of said countersunk portions are positioned either on or below a hypothetical extended surface of a lower one of the bearing surfaces.

2. The linear motion rolling guide unit of claim 1, wherein said first track rail has a mounting surface on its bottom for mounting to a prescribed frame, said track surface of said first track rail and countersunk portions being formed in the side and uppermost side, respectively, of said first track rail, and said direction is the direction from said uppermost portion towards said mounting surface.

* * * * *